(No Model.)

J. H. G. ZUNNER.
APPARATUS FOR HEATING TAR.

No. 488,414. Patented Dec. 20, 1892.

Witnesses.
Lauritz W. Möller
Alice A. Perkins

Inventor.
John H. G. Zunner.
by Alban Andrén
Attorney

UNITED STATES PATENT OFFICE.

JOHN H. G. ZUNNER, OF BOSTON, MASSACHUSETTS.

APPARATUS FOR HEATING TAR.

SPECIFICATION forming part of Letters Patent No. 488,414, dated December 20, 1892.

Application filed June 14, 1892. Serial No. 436,728. (No model.)

*To all whom it may concern:*

Be it known that I, JOHN H. G. ZUNNER, a citizen of the United States, and a resident of Boston, in the county of Suffolk and State of Massachusetts, have invented new and useful Improvements in Apparatus for Pitching Barrels, of which the following, taken in connection with the accompanying drawings, is a specification.

This invention relates to improvements in apparatus for pitching or coating the interior of beer barrels with liquid pitch or rosin and it consists in means for automatically regulating and maintaining a constant and normal temperature of the liquid pitch or rosin in the heating kettle and it also consists in the combination with a pitching kettle of a quantity chamber connected to the kettle and adapted to contain a quantity of pitch sufficient for the coating or lining of one barrel as will hereinafter be more fully shown and described, reference being had to the accompanying drawings, wherein—

Figure 1:
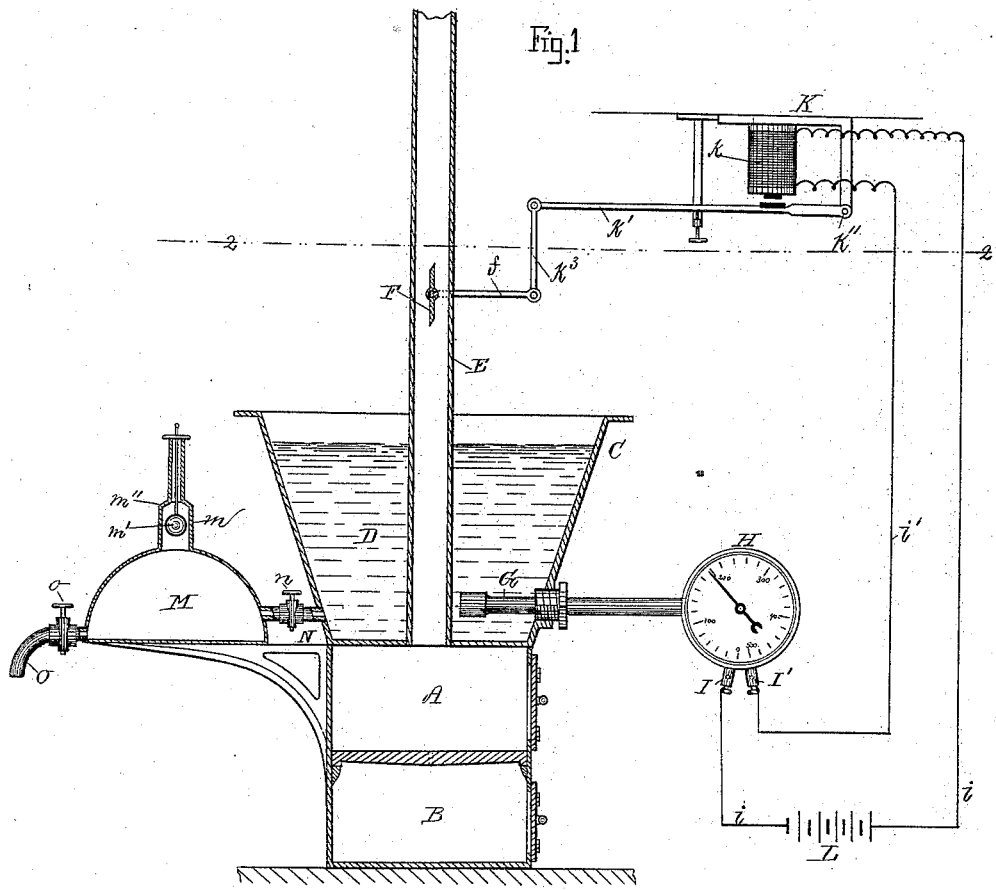
Figure 2:
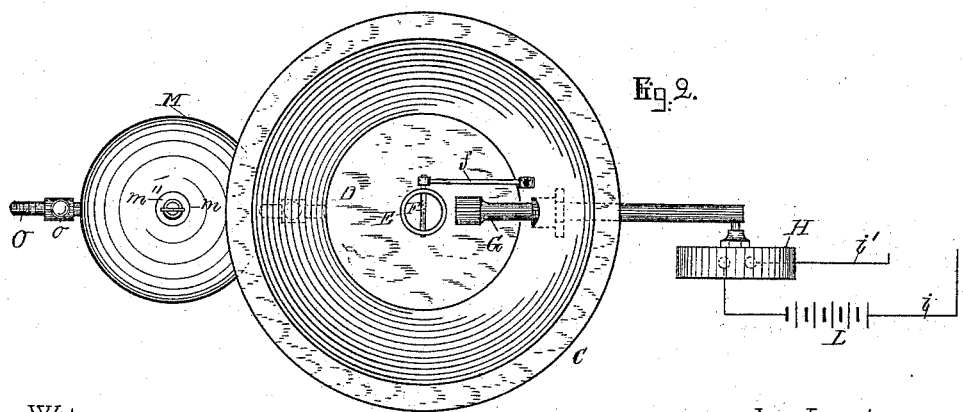

Figure 1 represents a vertical section of my improved apparatus parts of which are shown in elevation; and Fig. 2 represents a horizontal section on the line 2 2 shown in Fig. 1.

Similar letters refer to similar parts wherever they occur on the different parts of the drawings.

In the drawings A represents a furnace or fire pot having an ash pit B below it as usual.

C is a kettle adapted to contain the pitch or rosin D that is to be heated; said kettle is placed above the furnace A and in practice I prefer to carry the smoke stack or chimney E up through the kettle C and its liquid contents as shown in the drawings but this is not essential.

F is the damper in the chimney E and $f$ is a suitable lever or other operative device attached to the damper spindle outside of the said chimney as shown in the drawings.

For the purpose of maintaining a normal temperature of the liquid contents of the kettle, I arrange therein a thermometer G which is connected to a thermostat H of any well known construction, said thermostat having cups I, I', connected by means of wires $i$ and $i'$ to an electro-magnet $k$ of a suitable damper motor or regulator K as shown in Fig. 1.

L is a battery in the circuit. The interior mechanism of the thermostat is not shown as it is of the well known construction in which an electric circuit is automatically closed when the desired temperature is reached for which the thermostat is set.

The motor K may be of any suitable construction; in Fig. 1, I have shown it as composed of an electro magnet $k$ in the circuit, an armature lever $k'$ pivoted at $k''$ and having its free end connected by means of a link $k^3$ to the damper lever $f$.

From the above it will be seen that when the desired temperature of the contents of the kettle is reached, the thermostat causes the circuit through battery L to be closed by which the armature lever $k'$ is attracted toward the electro magnet causing the damper F to be closed or partially so by which the draft from the furnace is reduced thus preventing the pitch or rosin in the kettle from being heated above the desired temperature. As soon as the temperature in the kettle falls below the desired normal one the thermostat breaks the circuit, causing the armature lever $k'$ to drop and by its connection to the damper F causes the latter to swing open thus increasing the draft and raising the temperature of the pitch or rosin to the desired degree.

In connection with the kettle C, I use a quantity chamber or receptacle M, which is in communication with the interior of the kettle C by means of a pipe N provided with a valve or cut-off $n$ as shown. From the lower portion of the chamber M leads a discharge pipe O provided with a valve or cut-off $o$ through which the contents of the quantity chamber M is discharged into the barrel that is to be pitched. The quantity chamber M is adapted to contain sufficient amount of molten pitch for pitching one barrel. The upper portion of the chamber M is provided with an air pipe or inlet $m$ for admitting air into said chamber when the pitch or rosin is being discharged from it, and for the purpose of preventing the pitch from rising up and out through such air pipe when the chamber M is being filled, I locate in said pipe a suitable valve $m'$ adapted to close against a valve seat $m''$ as shown in Fig. 1.

In practice I heat the pitch or rosin in the kettle C to about 400° Fahrenheit and maintain it by the electric, thermostatic apparatus at this temperature or very nearly so.

In pitching the barrels I first open the cock $n$ causing the chamber M to be filled with the liquid pitch sufficient in quantity for pitching one barrel. After the chamber M is filled, I close the cock $n$. The bung hole of the barrel to be pitched is then placed directly below the end of the discharge pipe O, the cock $o$ is opened allowing the proper quantity of the heated liquid pitch to run into the barrel which is then turned around sidewise and from end to end causing any of the old pitch coating in the barrel to be liquefied by the fresh pitch and causing the interior of the barrel to be thoroughly and uniformly pitched without the need of any previous heating of the barrel which is apt to injure and disintegrate it. The surplus pitch is drained off from the interior of the barrel as usual after it has been pitched as above described.

Having thus fully described the nature, construction and operation of my invention, I wish to secure by Letters Patent and claim:

1. In an apparatus for pitching barrels, the combination with the kettle C and means for heating the same, of the quantity chamber M having a valved air inlet $m$ and a valved discharge pipe O, and the valved pipe N that connects said kettle and chamber, substantially as shown and described.

2. The herein described apparatus for pitching barrels consisting of the furnace A having a smoke stack E provided with a damper F, the kettle C, a thermometer and thermostat connected with the kettle, an electro-motor and connections between the thermostat and the damper, the quantity chamber M having a valved discharge pipe O, and the valved pipe N that connects said kettle and chamber, substantially as described.

In testimony whereof I have signed my name to this specification, in the presence of two subscribing witnesses, on this 3d day of June, A. D. 1892.

JOHN H. G. ZUNNER.

Witnesses:
ALBAN ANDRÉN,
ALICE A. PERKINS.